US008610568B2

United States Patent
Cai et al.

(10) Patent No.: US 8,610,568 B2
(45) Date of Patent: Dec. 17, 2013

(54) EMERGENCY RESPONSE SYSTEM AND METHOD

(75) Inventors: Yi-Wen Cai, New Taipei (TW); Shih-Cheng Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 162 days.

(21) Appl. No.: 13/329,244

(22) Filed: Dec. 17, 2011

(65) Prior Publication Data

US 2013/0154832 A1  Jun. 20, 2013

(51) Int. Cl.
*G08B 21/00* (2006.01)

(52) U.S. Cl.
USPC .................. 340/540; 340/573.1; 340/539.11; 340/8.1

(58) Field of Classification Search
USPC ......... 340/540, 501, 506, 531, 539.1, 539.11, 340/573.1, 6.1, 3.1, 8.1
See application file for complete search history.

(56) References Cited

U.S. PATENT DOCUMENTS

| | | | |
|---|---|---|---|
| 6,035,187 A * | 3/2000 | Franza | 455/404.1 |
| 6,198,914 B1 * | 3/2001 | Saegusa | 455/404.2 |
| 6,262,655 B1 * | 7/2001 | Yoshioka et al. | 340/425.5 |
| 2006/0011399 A1 * | 1/2006 | Brockway et al. | 180/272 |
| 2007/0041514 A1 * | 2/2007 | Rodkey et al. | 379/37 |
| 2008/0174418 A1 * | 7/2008 | Wartofsky et al. | 340/514 |
| 2010/0238052 A1 * | 9/2010 | Ito et al. | 340/988 |
| 2012/0001746 A1 * | 1/2012 | Kamiya | 340/449 |

\* cited by examiner

*Primary Examiner* — Daniel Previl
(74) *Attorney, Agent, or Firm* — Altis Law Group, Inc.

(57) ABSTRACT

An emergency response system is provided. The emergency response system includes an administrator information database capable of storing an administrator information, an emergency device information database capable of storing an emergency device information, a control unit, and a communication unit. The control unit searches the administrator information database to find the administrator information corresponding to a report signal, thereby generating a notification signal according to the administrator information, and searches the emergency device information database to find the emergency device information corresponding to the report signal, thereby generating a reply signal including a nearby emergency device information according to the emergency device information. In response to receiving the report signal from the user terminal, the communication unit transmits the notification signal to an administrator terminal, and transmits the reply signal to the user terminal. The disclosure further provides an emergency response method.

20 Claims, 5 Drawing Sheets

EMERGENCY RESPONSE SYSTEM AND METHOD

BACKGROUND

1. Technical Field

The present disclosure relates to an emergency response system and an emergency response method, and particularly to an emergency response system and an emergency response method automatically providing an emergency device information in response to an accident report.

2. Description of Related Art

Generally, a person who reports an accident will remain at the scene of the accident until first responders or rescuers arrive. However, the effectiveness of the report and the rescue can be diminished by uncertainties such as the failure of the report system, failure to reach the administrator of the report system or the responders, or the responders cannot arrives on the scene in time. Furthermore, some rescue methods are unfamiliar to most people.

What is needed, therefore, is an emergency response system capable of overcoming the limitation described.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

Figure 1:
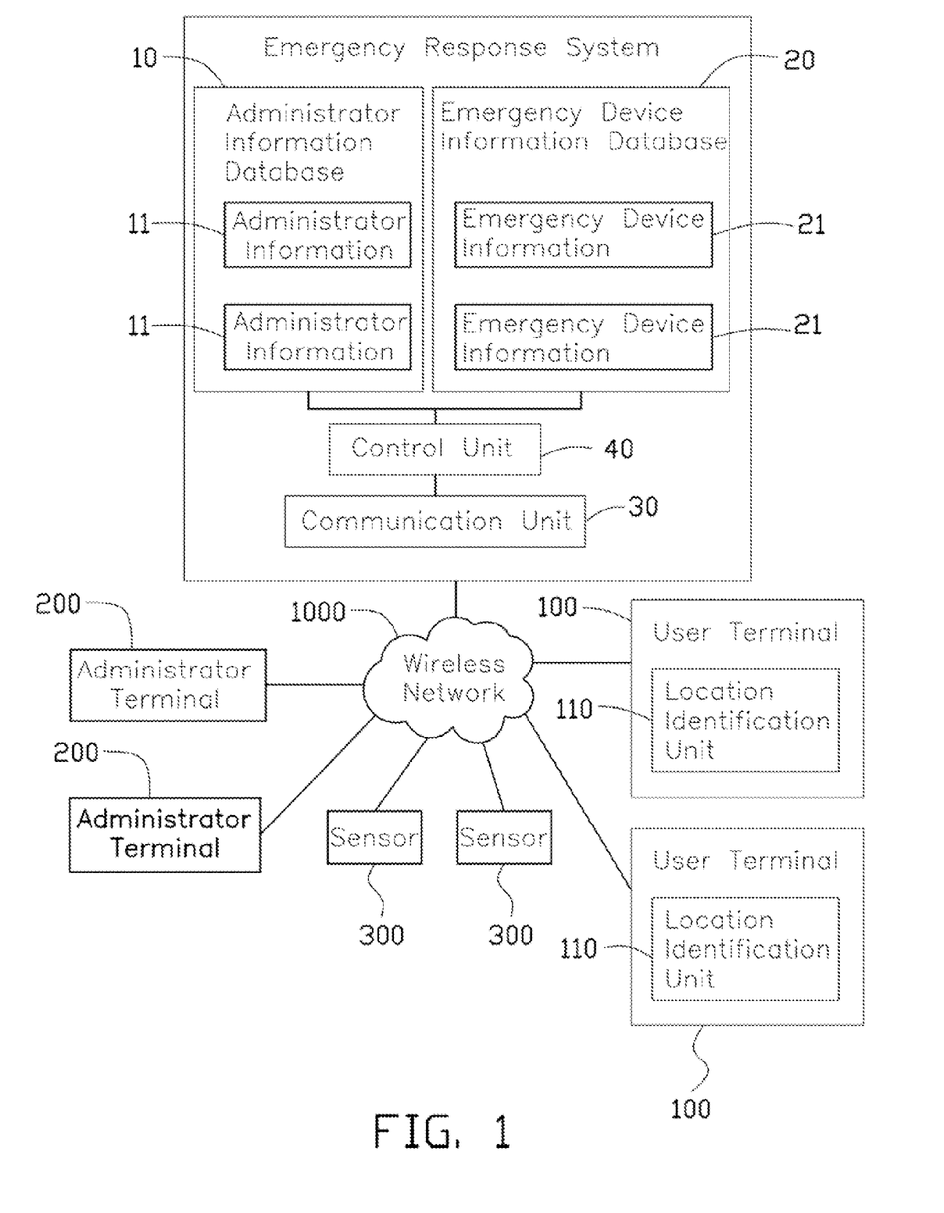
FIG. 1 is a block diagram of an embodiment of an emergency response system of the present disclosure.

FIG. 1 is a block diagram of an embodiment of an emergency response system of the present disclosure. In the illustrated embodiment, the emergency response system is applied to an fire emergency. In other embodiments, the emergency response system can be applied to a report of other types of emergencies such as criminal actions. As shown in FIG. 1, an emergency response system includes an administrator information database 10, an emergency device information database 20, a communication unit 30, and a control unit 40. The administrator information database 10 is capable of storing a plurality of administrator information 11. Each of the administrator information 11 includes the information of the persons responding to an accident, for example, the telephone number of fire commanders, fire responders, or police officers. The emergency device information database 20 is capable of storing a plurality of emergency device information 21. The emergency device information 21 includes an emergency device location Id (not shown) which represents the location of an emergency device. In other embodiments, the emergency device information 21 can further includes other emergency device related information such as emergency device type and emergency device usage, wherein the emergency device can be, for example, an extinguisher or a first-aid box.

The communication unit 30 receives a report signal Sr (not shown) including a user terminal location information It (not shown) from user terminals 100 such as mobile phones or fixed emergency button. The user terminal location information It is a computer-recognizable information having a specific format which includes a field such as a GPS position of the user terminals 100. In the illustrated embodiment, the emergency response system is connected to the user terminals 100 through a wireless communication network 1000 implemented according to a telecommunication standard such as GSM (Global System for Mobile Communications), Wi-Fi, and Bluetooth. In other embodiments, the emergency response system can be connected to the user terminals 100 through other methods such as using a computer network or hard-wiring. The report signal Sr can be, for example, a mobile phone signal including a report of a fire alarm or a criminal action. In the illustrated embodiment, each of the user terminals 100 includes a location identification unit 110 for producing the user terminal location information It. The location identification unit 110 can be a GPS (Global Positioning System) receiver which produces the user terminal location information It including a latitude, a longitude, and an elevation of the user terminals 100, or other types of devices such as WPS (Wi-Fi Positioning System) receiver while the user terminal location information It can include other types of location related parameters of the user terminals 100. In other embodiments, the user terminal location information It can be predetermined when the user terminals 100 is a fixed device.

The control unit 40 searches the administrator information database 10 to find the administrator information 11 which corresponds to the report signal Sr, thereby generating a notification signal Sn (not shown) according to the administrator information 11. For instance, if the report signal Sr represents a report of a fire alarm, the control unit 40 searches the administrator information database 10 to find the administrator information 11 including the telephone number of fire commanders, thereby generating the notification signal Sn which is a telephone signal to telephone the fire commanders. The notification signal Sn can include, for example, the location or the situation of the scene of a fire. The communication unit 30 transmits the notification signal Sn to an administrator terminal 200 such as the telephone of a fire commander, thereby informing the user of the administrator terminal 200. The control unit 40 further determines whether the report signal Sr includes the scene information Is, wherein the report signal Sr including the scene information Is can be received from the user terminals 100, or sensors 300 located corresponding to the location of the user terminal 100, for example, fixed temperature sensors located within 20 meters from the location of the user terminal 100. When the report signal Sr does not include the scene information Is, the control unit 40 searches the emergency device information database 20 to find the emergency device information 21 which has the emergency device location Id corresponding to a user terminal location information It (not shown) in the report signal Sr. For instance, the control unit 40 searches the emergency device information database 20 to find the emergency device information 21 which has the emergency device location Id representing a location within a distance (such as 100 meters) from the location of the user terminal 100 which is represented by the user terminal location information It. The control unit 40 generates a reply signal Sp (not shown) including a nearby emergency device information which includes the location of an emergency device according to the emergency device information 21, such that the user terminal 100 can provide a message to inform the user of the user terminal 100 about the location of the emergency device according to the nearby emergency device information. The reply signal Sp can be, for example, a mobile phone signal, a telephone signal, or a network signal.

When the report signal Sr includes the scene information Is, the control unit 40 searches the emergency device information database 20 to find the emergency device information 21 which has the emergency device location Id corresponding to the user terminal location information It and other emergency device related information such as emergency device type corresponding to the scene information Is. For instance, if the scene information Is represents the situation of the scene of a fire, the control unit 40 searches the emergency device information database 20 to find the emergency device information 21 which has the emergency device location Id representing a location within a distance such as 100 meters from the location of the user terminal 100 represented by the user terminal location information It, and has an emergency device type of extinguisher. In addition, when the report signal Sr includes an audio information Ia (not shown), the control unit 40 transforms the audio information Ia to a computer-recognizable scene information Ic (not shown) such as the scene information Is, and searches the emergency device information database 20 to find the emergency device information 21 corresponding to the user terminal location information and the computer-recognizable scene information Ic (and other computer-recognizable information in the report signal Sr, if any), wherein the transformation of the audio information Ia can be performed by natural language processing (NLP). If the user terminal location information It is included in the audio information Ia, the control unit 40 derives the user terminal location information It from the computer-recognizable scene information Ic, searches the administrator information database 10 to find the administrator information 11 corresponding to the computer-recognizable scene information Ic (and other computer-recognizable information in the report signal Sr, if any), and searches the emergency device information database 20 to find the emergency device information 21 corresponding to the user terminal location information It (and other computer-recognizable information in the report signal Sr, if any). The communication unit 30 transmits the reply signal Sp to the user terminal 100, thereby replying to the report of the user of the user terminal 100.

In the illustrated embodiment, if the communication unit 30 does not receive a response signal Sa (not shown) which is from the administrator terminal 200 within a predetermined period of time, for example, 5 minutes, after transmitting the notification signal Sn to the administrator terminal 200, the control unit 40 determines whether the report signal Sr includes a scene information Is. The response signal Sa is submitted by the user of the administrator terminal 200, which represents a confirmation of the user. When the report signal Sr includes the scene information Is, the control unit 40 generates a suggestion signal Ss (not shown) including a suggestion information Ig (not shown) according to the scene information Is. For instance, if the scene information Is includes the situation of the scene of a fire, the control unit 40 generates the suggestion signal Ss according to the situation, wherein the suggestion information Ig includes a suggestion such as using an emergency device, evacuation or refuge. When the report signal Sr does not include the scene information Is, the control unit 40 transmits a query signal Sq (not shown) including a scene information query information to the user terminal 100, thereby querying the user of the user terminal 100 about the situation of the scene of a fire. After the communication unit 30 receives the report signal Sr including the scene information Is from the user terminal 100 which corresponds to the query signal Sq, the control unit 40 generates the suggestion signal Ss according to the scene information Is in the report signal Sr. The control unit 40 transmits the suggestion signal Ss to the user terminal 100, such that the user terminal 100 can provide a message to suggest the user of the user terminal 100 according to the suggestion information Ig.

In addition, when the communication unit 30 receives the report signal Sr including the scene information Is from the sensors 300, the control unit 40 generates the suggestion signal Ss including the suggestion information Ig according to the scene information Is. For instance, if the communication unit 30 receives the report signal Sr from the sensor 300 which is a fixed temperature sensor located within 20 meters from the location of the user terminal 100, the control unit 40 determines if evacuation is suggested according to the scene information Is which represents a temperature. The communication unit 30 transmits the suggestion signal Ss to the user terminal 100, such that the user terminal 100 can provide a message to the user of the user terminal 100 according to the suggestion information Ig.

Figure 2:
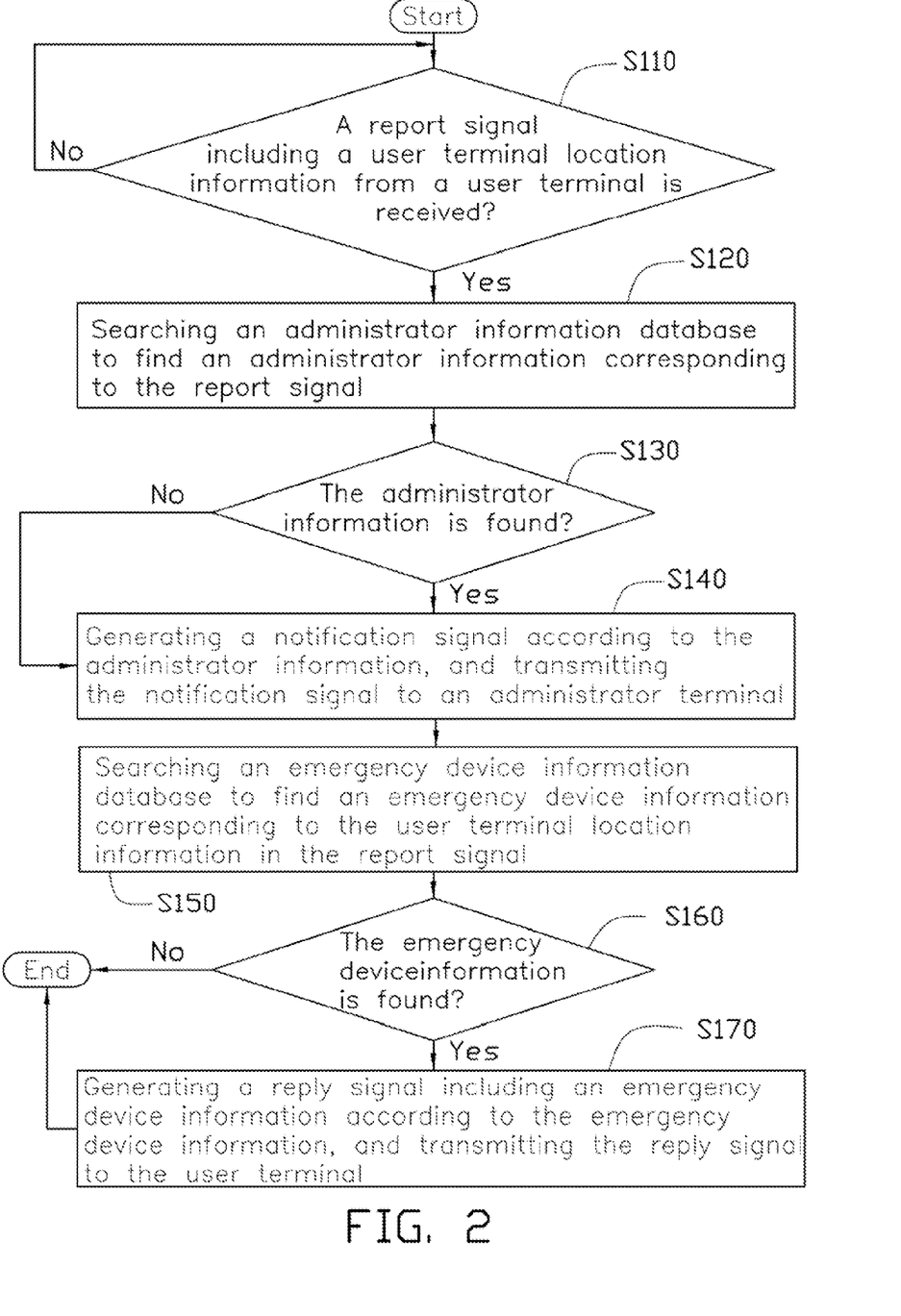
FIG. 2 is a flowchart of a first embodiment of an emergency response method of the present disclosure.

FIG. 2 is a flowchart of a first embodiment of an emergency response method of the present disclosure. As shown in FIG. 2, the emergency response method of the present disclosure is as follows. Depending on the embodiment, additional steps may be added, others removed, and the ordering of the steps may be changed.

In step S110, the reception of a report signal including a user terminal location information from a user terminal is determined. If the report signal is received, step S120 is implemented; otherwise, step S110 is repeated. In the illustrated embodiment, the user terminal location information is detected by a location identification unit of the user terminal.

In step S120, an administrator information database is searched to find an administrator information corresponding to the report signal.

In step S130, the search result of the administrator information database is determined. If the administrator information is found, step S140 is implemented; otherwise, step S150 is implemented.

In step S140, a notification signal is generated according to the administrator information, and the notification signal is transmitted to an administrator terminal.

In step S150, an emergency device information database is searched to find an emergency device information corresponding to the user terminal location information in the report signal. The emergency device information includes an emergency device location which represents the location of an emergency device. In other embodiments, when the report signal includes a scene information, the emergency device information database is searched to find the emergency device information corresponding to the user terminal location information and the scene information in the report signal, wherein the report signal including the scene information can be received from the user terminals or sensors located corresponding to the location of the user terminal.

In step S160, the search result of the emergency device information database is determined. If the emergency device information is found, step S170 is implemented. Otherwise, the method is terminated.

In step S170, a reply signal including a nearby emergency device information is generated according to the emergency device information, and the reply signal is transmitted to the user terminal.

In addition, when the report signal includes an audio information, after implementing step S110, the audio information is transformed to a computer-recognizable scene information. Correspondingly, step S150 searches the emergency device information database to find the emergency device information corresponding to the user terminal location information and the computer-recognizable scene information. If the user terminal location information is included in the audio information, step 120 derives the user terminal location information from the computer-recognizable scene information, and searches the administrator information database to find the administrator information corresponding to the computer-recognizable scene information. Correspondingly, step S150 searches the emergency device information database to find the emergency device information corresponding to the user terminal location information.

Figure 3:
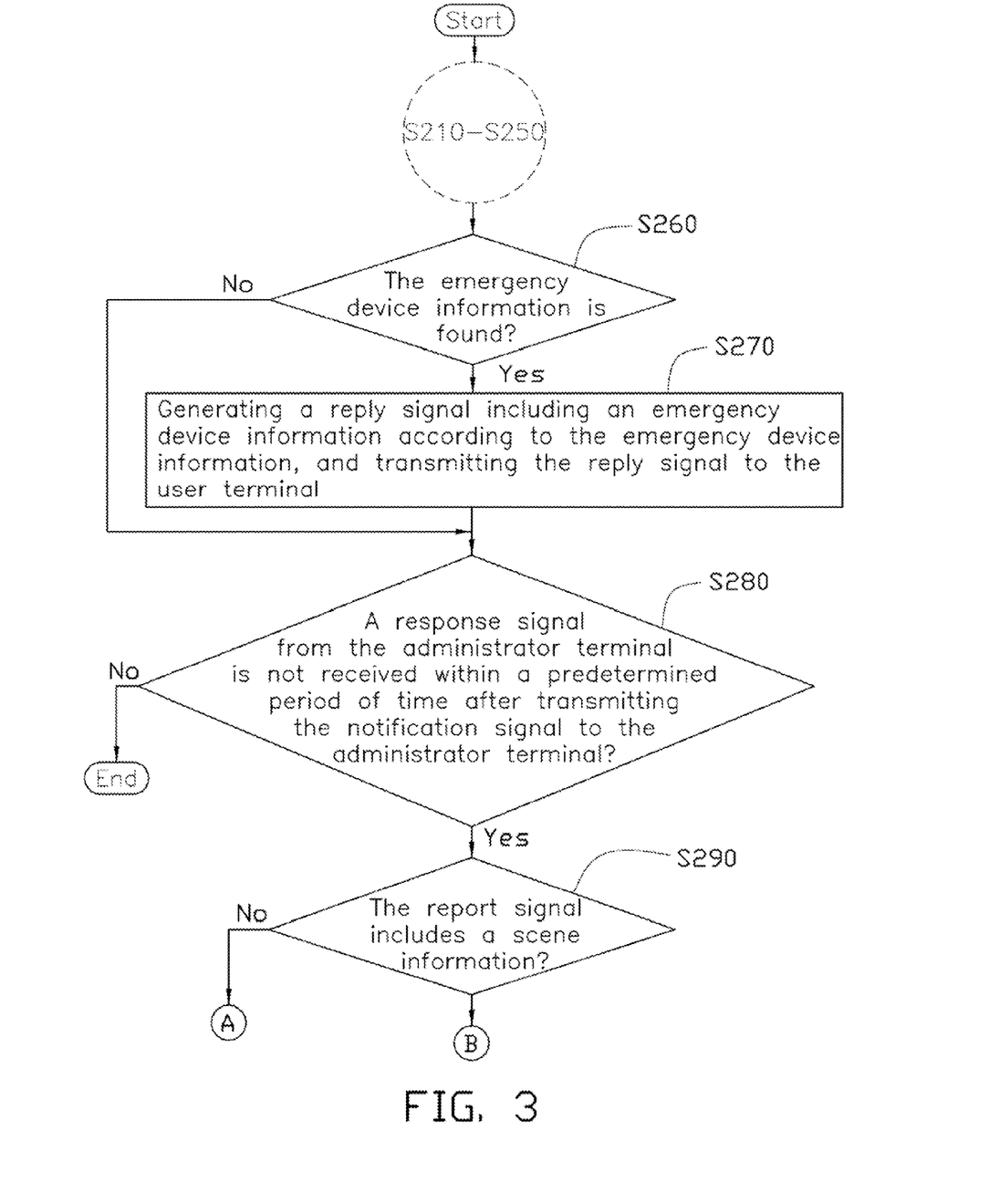
FIGS. 3 and 4 are a flowchart of a second embodiment of an emergency response method of the present disclosure.
Figure 4:
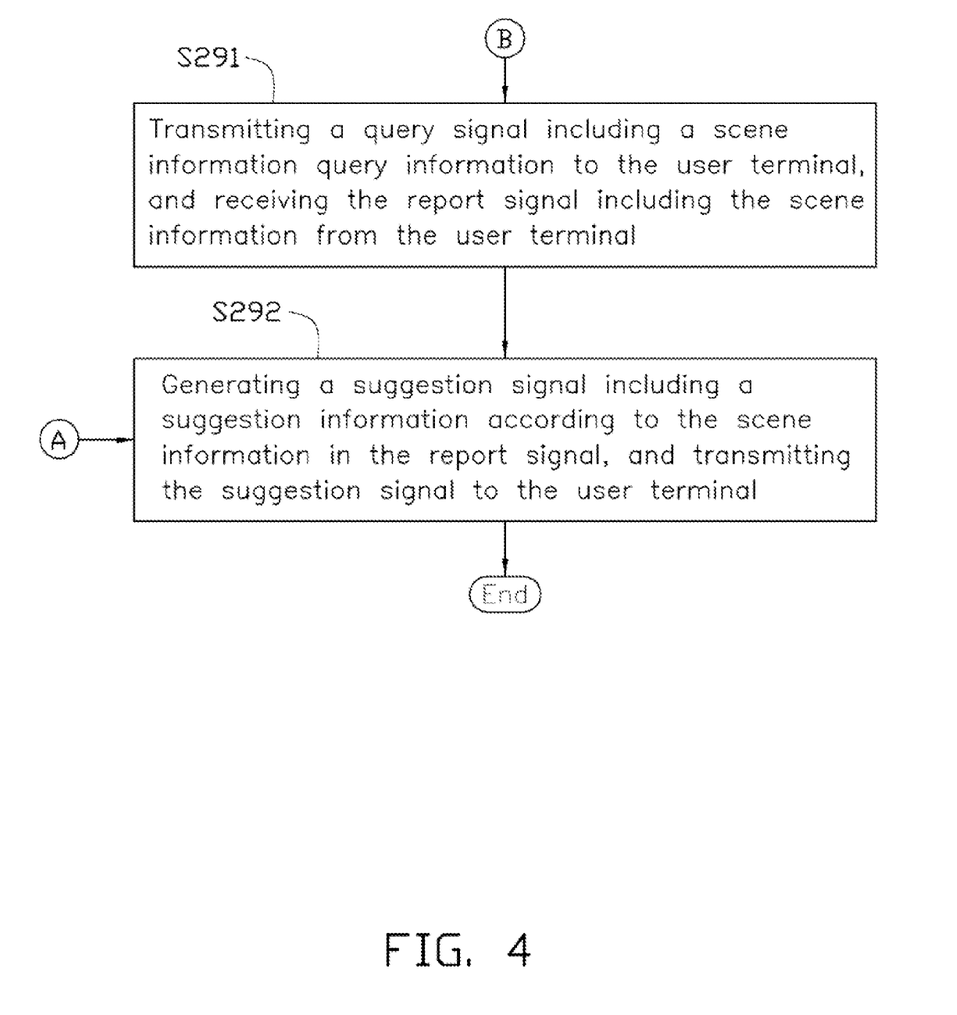

FIGS. 3 and 4 are a flowchart of a second embodiment of an emergency response method of the present disclosure. As shown in FIGS. 3 and 4, the emergency response method of the present disclosure is as follows. Depending on the embodiment, additional steps may be added, others removed, and the ordering of the steps may be changed.

Steps S210 to S250 and S270 are equivalent to S110 to S150 and S170 as detailed above, respectively, and will not be described in below.

In step S260, the search result of the emergency device information database is determined. If the emergency device information is found, step S270 is implemented; otherwise, step S280 is implemented.

In step S280, the reception of a response signal from the administrator terminal is determined. If the response signal is received within a predetermined period of time after transmitting the notification signal to the administrator terminal, step S290 is implemented. Otherwise, the method is terminated.

In step S290, the report signal is determined to see if a scene information is included. If the scene information is not included in the report signal, step S291 is implemented; otherwise, step S292 is implemented.

In step S291, a query signal including a scene information query information is transmitted to the user terminal.

In step S292, in response to receiving the report signal including the scene information from the user terminal, a suggestion signal including a suggestion information is generated according to the scene information in the report signal, and the suggestion signal is transmitted to the user terminal.

Figure 5:
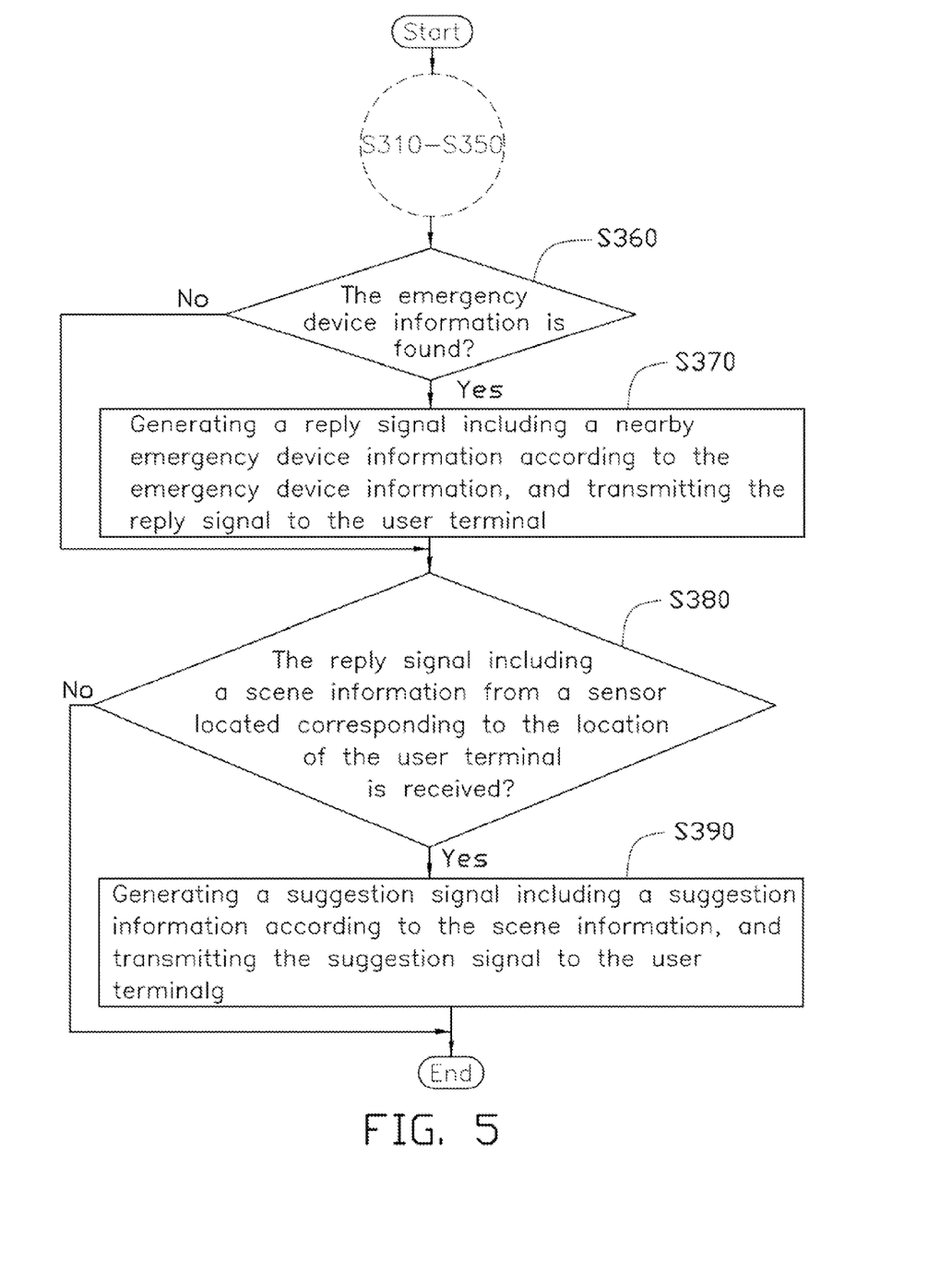
FIG. 5 is a flowchart of a third embodiment of an emergency response method of the present disclosure.

FIG. 5 is a flowchart of a third embodiment of an emergency response method of the present disclosure. As shown in FIG. 5, the emergency response method of the present disclosure is as follows. Depending on the embodiment, additional steps may be added, others removed, and the ordering of the steps may be changed.

Steps S310 to S350 and S370 are equivalent to S110 to S150 and S170 as detailed above, respectively, and will not be described in below.

In step S360, the search result of the emergency device information database is determined. If the emergency device information is found, step S370 is implemented; otherwise, step S380 is implemented.

In step S380, the reception of the reply signal including a scene information from a sensor located corresponding to the location of the user terminal is determined. If the report signal is received, step S390 is implemented. Otherwise, the method is terminated.

In step S390, a suggestion signal including a suggestion information is generated according to the scene information, and the suggestion signal is transmitted to the user terminal.

The emergency response system and the emergency response method transmit a reply signal including a nearby emergency device information to a user terminal, such that the user terminal can provide a message according to the nearby emergency device information, thereby informing the user of the user terminal about the location of an emergency device near to the user terminal. As a result, the user can reach the emergency device quickly, instead of merely waiting for a rescue or look for a nearby rescue randomly.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. An emergency response system, comprising:
an administrator information database storing at least an administrator information;
an emergency device information database storing at least an emergency device information;
a control unit, wherein the control unit searches the administrator information database to find the administrator information corresponding to a report signal and generates a notification signal according to the administrator information, and searches the emergency device information database to find the emergency device information corresponding to a user terminal location information of a user terminal in the report signal and generates a reply signal including a nearby emergency device information according to the emergency device information; and
a communication unit, wherein the communication unit transmits the notification signal to an administrator terminal and transmits the reply signal to the user terminal in response to receiving the report signal from the user terminal.

2. The emergency response system of claim 1, wherein the nearby emergency device information in the reply signal includes an emergency device location.

3. The emergency response system of claim 1, wherein the report signal includes a scene information, the control unit generates a suggestion signal including a suggestion information according to the scene information when the communication unit does not receive a response signal from the administrator terminal within a predetermined period of time after the communication unit transmits the notification signal to the administrator terminal, and transmits the suggestion signal to the user terminal.

4. The emergency response system of claim 3, wherein when the response signal is not received within the predetermined period of time, the control unit transmits a query signal including a scene information query information to the user terminal while the report signal not includes the scene information, the communication unit receives the report signal including the scene information from the user terminal, and the control unit generates the suggestion signal including the suggestion information according to the scene information in the report signal.

5. The emergency response system of claim 1, wherein the report signal includes a scene information, the control unit searches the emergency device information database to find the emergency device information corresponding to the user terminal location information and the scene information.

6. The emergency response system of claim 1, wherein the report signal includes an audio information, the control unit transforms the audio information to a computer-recognizable scene information, and searches the emergency device information database to find the emergency device information corresponding to the user terminal location information and the computer-recognizable scene information.

7. The emergency response system of claim 1, wherein the user terminal location information is included in an audio information of the report signal, the control unit transforms the audio information to a computer-recognizable scene information, derives the user terminal location information from the computer-recognizable scene information, searches the administrator information database to find the administrator information corresponding to the computer-recognizable scene information, and searches the emergency device information database to find the emergency device information corresponding to the user terminal location information.

8. The emergency response system of claim 1, wherein the communication unit receives the report signal including a scene information from a sensor located corresponding to the location of the user terminal, the control unit searches the emergency device information database to find the emergency device information corresponding to the user terminal location information and the scene information in the report signal.

9. The emergency response system of claim 1, wherein the communication unit receives the report signal including a scene information from a sensor located corresponding to the location of the user terminal, the control unit generates a suggestion signal including a suggestion information according to the scene information, the communication unit transmits the suggestion signal to the user terminal.

10. The emergency response system of claim 1, wherein the emergency device information includes an emergency device location of at least one emergency device.

11. An emergency response method, comprising:
receiving a report signal including a user terminal location information from a user terminal;
searching an administrator information database to find an administrator information corresponding to the report signal;
searching an emergency device information database to find an emergency device information corresponding to the user terminal location information in the report signal;
when the administrator information is found, generating a notification signal according to the administrator information, and transmitting the notification signal to an administrator terminal; and
when the emergency device information is found, generating a reply signal including a nearby emergency device information according to the emergency device information, and transmitting the reply signal to the user terminal.

12. The emergency response method of claim 11, wherein the nearby emergency device information in the reply signal includes an emergency device location.

13. The emergency response method of claim 11, further comprising:
determining a response signal from the administrator terminal not being received within a predetermined period of time after transmitting the notification signal to the administrator terminal; and
when the response signal not being received within the predetermined period of time, generating a suggestion signal including a suggestion information according to a scene information in the report signal, and transmitting the suggestion signal to the user terminal.

14. The emergency response method of claim 13, wherein the step of generating the suggestion signal includes:

when the response signal not being received within the predetermined period of time, determining whether the report signal includes the scene information;
when the report signal not includes the scene information, transmitting a query signal including a scene information query information to the user terminal, and receiving the report signal including the scene information from the user terminal; and
generating the suggestion signal including the suggestion information according to the scene information in the report signal while the predetermined period of time passes before receiving the response signal.

15. The emergency response method of claim 11, wherein the report signal includes a scene information, the step of searching the emergency device information database includes:
searching the emergency device information database to find the emergency device information corresponding to the user terminal location information and the scene information in the report signal.

16. The emergency response method of claim 11, further comprising:
receiving the report signal including an audio information from the user terminal;
transforming the audio information to a computer-recognizable scene information;
the step of searching the emergency device information database includes:
searching the emergency device information database to find the emergency device information corresponding to the user terminal location information and the computer-recognizable scene information.

17. The emergency response method of claim 11, wherein the user terminal location information is included in an audio information of the report signal, the step of receiving the report signal includes:
receiving the report signal including the audio information from the user terminal;
transforming the audio information to a computer-recognizable scene information; and
deriving the user terminal location information from the computer-recognizable scene information;
the step of searching the administrator information database includes:
searching the administrator information database to find the administrator information corresponding to the computer-recognizable scene information;
the step of searching the emergency device information database includes:
searching the emergency device information database to find the emergency device information corresponding to the user terminal location information.

18. The emergency response method of claim 11, further comprising:
receiving the report signal including a scene information from a sensor located corresponding to the location of the user terminal;
the step of searching the emergency device information database includes:
searching the emergency device information database to find the emergency device information corresponding to the user terminal location information and the scene information in the report signal.

19. The emergency response method of claim 11, further comprising:

receiving the report signal including a scene information from a sensor located corresponding to the location of the user terminal;

generating a suggestion signal including a suggestion information according to the scene information; and transmitting the suggestion signal to the user terminal.

20. The emergency response method of claim 11, wherein the emergency device information includes an emergency device location of at least one emergency device.

\* \* \* \* \*